United States Patent [19]

Labaziewicz

[11] Patent Number: 5,166,715
[45] Date of Patent: Nov. 24, 1992

[54] CAMERA WITH FILM TAKE-UP CONFIRMING MECHANISM

[75] Inventor: Peter Labaziewicz, Rochester, N.Y.

[73] Assignee: Eastman Kodak Company, Rochester, N.Y.

[21] Appl. No.: 699,081

[22] Filed: May 13, 1991

[51] Int. Cl.[5] ............................................. G03B 1/18
[52] U.S. Cl. ............................ 354/173.1; 354/213; 354/215
[58] Field of Search .............. 354/173.1, 173.11, 212, 354/213, 215, 217

[56] References Cited

U.S. PATENT DOCUMENTS

| | | | |
|---|---|---|---|
| 4,334,753 | 6/1982 | Harvey | 354/289 |
| 4,440,481 | 4/1984 | Hoda et al. | 354/215 |
| 4,492,446 | 1/1985 | Zawodny et al. | 354/215 |
| 4,679,926 | 7/1987 | Suzuki et al. | 354/173.11 |
| 4,697,900 | 10/1987 | Eguchi et al. | 354/215 |
| 4,707,096 | 11/1987 | Lawther | 354/215 |
| 4,721,970 | 1/1988 | Beaver | 354/215 |
| 4,721,973 | 1/1988 | Harvey | 354/215 |
| 4,728,976 | 3/1988 | Takahashi et al. | 354/173.11 |

*Primary Examiner*—Michael L. Gellner
*Assistant Examiner*—David M. Gray
*Attorney, Agent, or Firm*—Roger A. Fields

[57] ABSTRACT

In a camera, a film presence sensing switch is located to detect the beginning of a full width main section of a filmstrip after a reduced width leading section of the filmstrip is wound at least partly onto a take-up spool. When a sufficient time has elapsed during the film winding operation for the reduced width section of the filmstrip to be wound onto the take-up spool, a motor drive for rotating the spool in a winding direction is de-energized should the switch fail to detect the beginning of the full width section of the filmstrip. Alternatively, the motor drive is allowed to remain energized to continue the film winding operation should the switch detect the beginning of the full width section.

3 Claims, 3 Drawing Sheets

CAMERA WITH FILM TAKE-UP CONFIRMING MECHANISM

BACKGROUND OF THE INVENTION

1. Field of the Invention

The invention relates generally to the field of photography, and in particular to a camera which when loaded with a lighttight film cartridge warns the user of a film take-up malfunction.

2. Description of the Prior Art

To load most 35 mm cameras, the film cartridge is inserted in a loading chamber of the camera and the forward end portion of a film leader projecting from a light trapping slit in the cartridge is placed over a film take-up spool in a take-up chamber of the camera. In some cameras, the forward end portion of the film leader is manually attached to the take-up spool before a back door of the camera is closed. Then, an initial film winding operation is performed, for example, by pivoting a winding lever and depressing a shutter release button several times until the entire leader is wound onto the take-up spool and the first available frame of the filmstrip is positioned for exposure. In other cameras, the forward end portion of the film leader is automatically secured to the take-up spool at the beginning of the initial film winding operation. As the take-up spool is rotated by a motor drive, for example, one or more circumferential teeth on the spool engage the forward end portion of the film leader in its perforations to wind the leader onto the spool and to position the first available frame of the filmstrip for exposure. A spring-like deflector or other suitable means may be provided on the back door of the camera for pressing the film leader against the take-up spool to facilitate engagement of the forward end portion of the leader by the teeth on the spool. After the first available frame of the filmstrip is exposed, subsequent exposures are made by repeating the film winding and shutter releasing operations.

A problem that exists in some 35 mm cameras as a consequence of the loading procedure is that, even though the user believes the forward end portion of the film leader is secured to the take-up spool, the forward end portion may fail to be engaged with the spool or may disengage from the spool during the initial film winding operation. As a result, the film leader will not be wound onto the take-up spool and the first available frame of the filmstrip cannot be positioned for exposure. However, since the back door of the camera is closed, the user may not become aware of the film take-up malfunction because the winding lever and the shutter release button can be manually operated in the usual way. The user, thus, under the delusion that the camera is working properly might begin photographing and would learn of the malfunction only when the back door of the camera is re-opened to remove the cartridge from the camera.

A prior art solution to the problem is disclosed in commonly assigned U.S. Pat. No. 4,334,753, issued Jun. 15, 1982. In this patent, when a film cartridge is first loaded into a 35 mm camera, a sensing lever is pivoted by a longitudinal edge of a reduced width leading section of the filmstrip to an intermediate position in which it blocks operation of a shutter release button and simultaneously provides a visual indication of the blockage in the viewfinder. If the leading section of the filmstrip is securely attached to a take-up spool in the camera and is wound at least partly onto the take-up spool in response to winding rotation of the spool, the sensing lever will be pivoted by a forward inclined edge of a full width main section of the filmstrip, following the leading section, from the intermediate position to another position in which it no longer blocks operation of the shutter release button and is removed from the viewfinder.

SUMMARY OF THE INVENTION

In a camera, a film presence sensing switch is located to detect the beginning of a full width main section of a filmstrip after a reduced width leading section of the filmstrip is wound at least partly onto a take-up spool. When a sufficient time has elapsed during the film winding operation for the reduced width section of the filmstrip to be wound onto the take-up spool, a motor drive for rotating the spool in a winding direction is de-energized should the switch fail to detect the beginning of the full width section of the filmstrip. Alternatively, the motor drive is allowed to remain energized to continue the film winding operation should the switch detect the beginning of the the full width section.

DETAILED DESCRIPTION OF THE PREFERRED EMBODIMENT

The invention is disclosed as being embodied preferably in a 35 mm camera. Because the features of this type of camera are well known, the description which follows is directed in particular to photographic elements forming part of or cooperating directly with the disclosed embodiment. It is understood, however, that other elements not specifically shown or described may take various forms known to persons of ordinary skill in the art.

Figure 1:
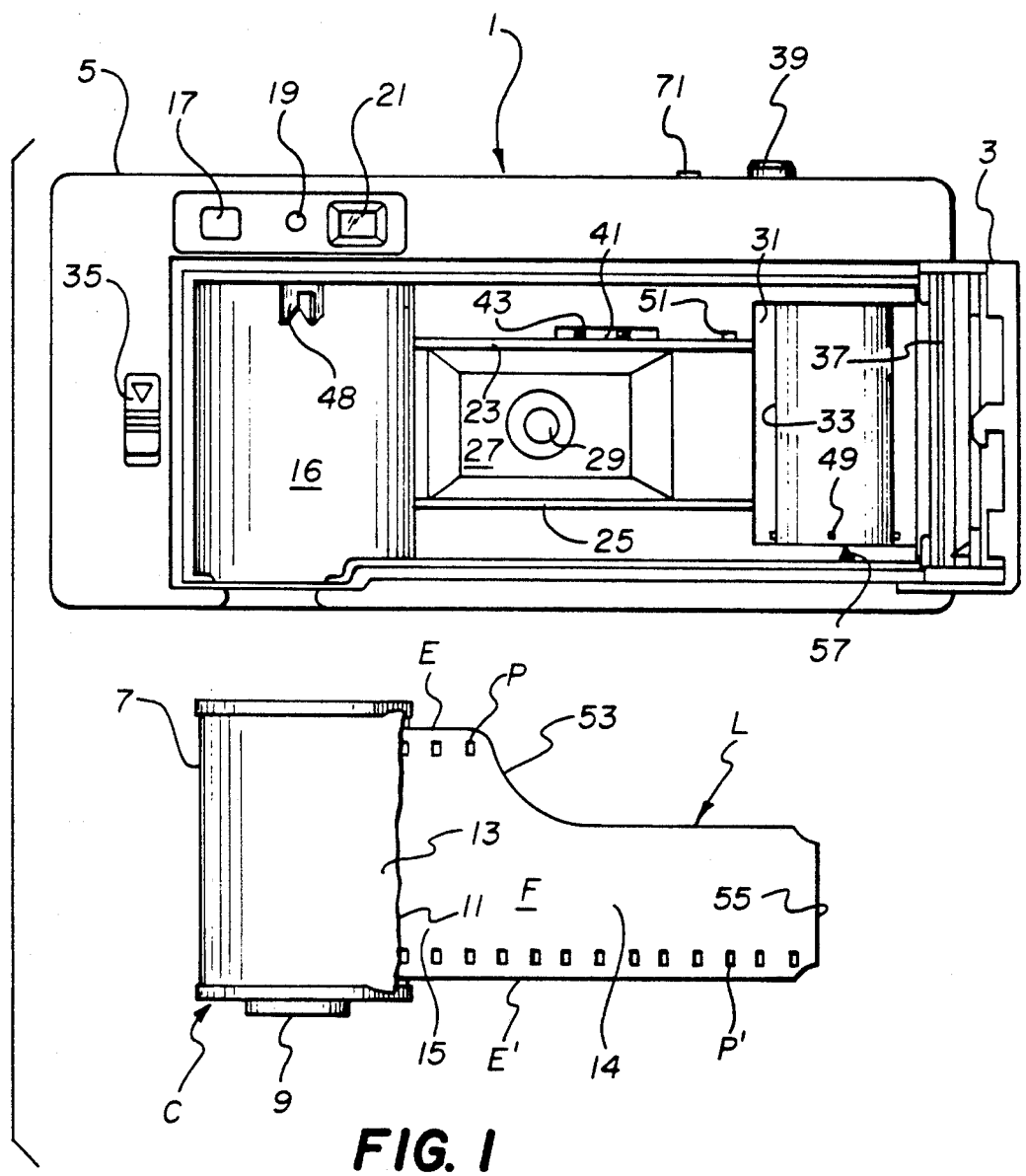
FIG. 1 is a rear elevation view of a 35 mm camera with its back door opened to receive a film cartridge having a film leader projecting from the cartridge.
Figure 2:
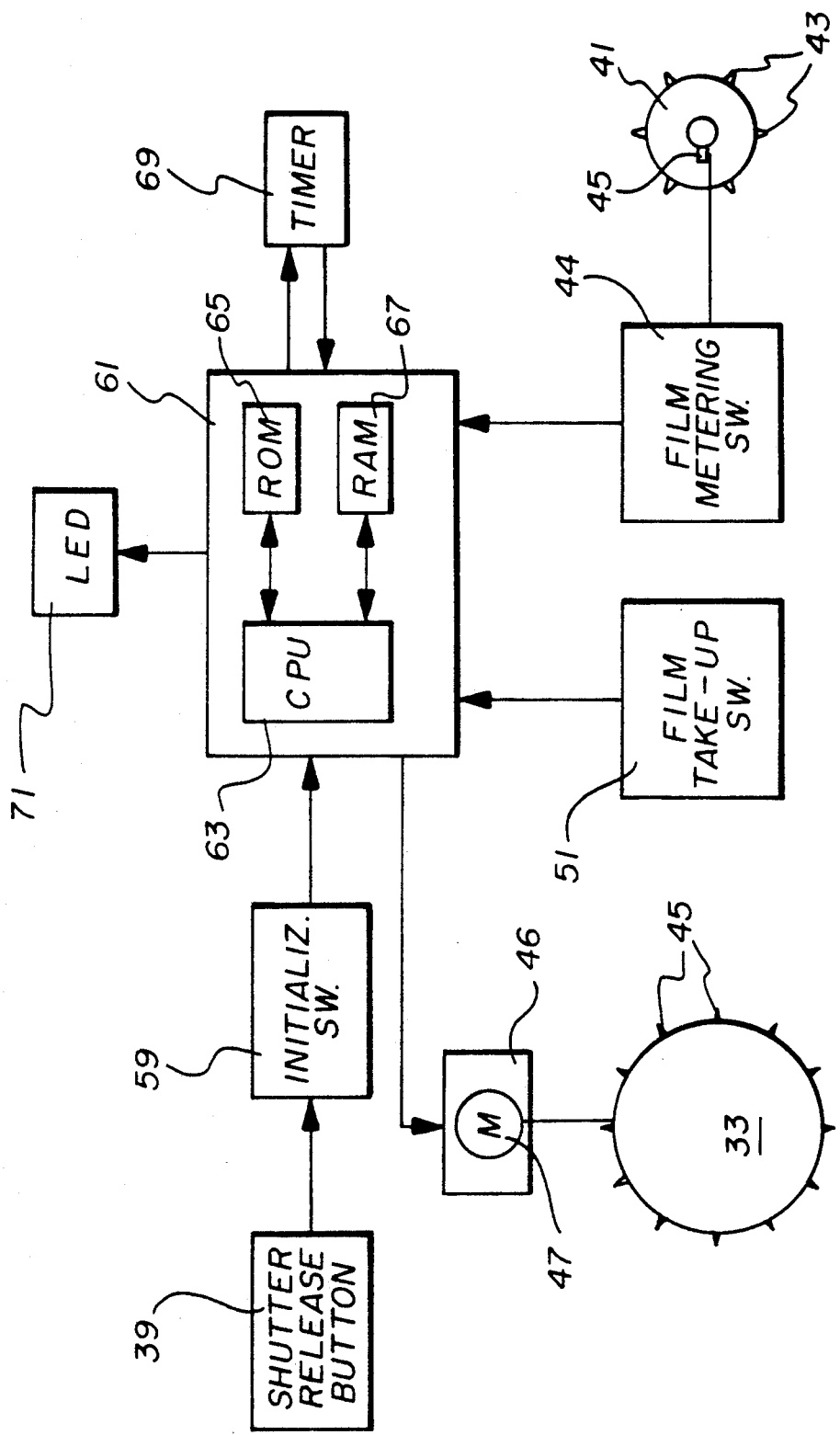
FIG. 2 is a schematic view in block diagram of a film take-up confirming mechanism in the camera, according to a preferred embodiment of the invention.

Referring now to the drawings and in particular to FIG. 1, a 35 mm camera 1 is shown with a back door 3 pivotally mounted on a rear portion of the camera body 5. The door 3 is opened to receive a known film cartridge C, such as one manufactured by Eastman Kodak Company. The film cartridge C comprises a light-tight container 7 housing a rotatably supported spool 9 on which is wound an edge-perforated 35 mm filmstrip F. The filmstrip F has an upper row of perforations P adjacent a longitudinal edge E and a lower row of perforations P' adjacent a longitudinal edge E' . A film leader L of the filmstrip F projects from a plush-lined, light trapping slit 11 in a throat 13 of the cartridge C and comprises a forward or leading section 14 whose width is approximately one-half of the width of the remainder of the filmstrip and a following section 15 whose width is the same as the remainder of the filmstrip. The 35 mm camera includes a number of known elements, such as a loading chamber 16 for receiving the cartridge C; a flash ready lamp 17 for a built-in electronic flash, not shown; a low light warning lamp 19; a viewfinder window 21; a pair of substantially parallel film rails 23 and 25; a film exposure window 27; an objective lens 29; a film take-up chamber 31 housing a film take-up spool 33 or drum; a manually operable latch 35 for securing the back door 3 closed; a pressure plate 37 spring-supported on the inside of the back door for holding successive frames on the filmstrip F flat on the pair of film rails 23 and 25 during film exposure at the exposure window 27; and a shutter release button 39 manually depressible to initiate film exposure. A known film metering sprocket 41 is rotatably supported above the exposure window 27 in FIG. 1 and has circumferential teeth 43 for engaging the filmstrip F at its respective perforations P to meter the filmstrip in successive frame increments according to convention. ss shown in FIG. 2, an open-biased film metering or film motion sensing switch 44 is closed by a projection 45 on the metering sprocket 45 each time the sprocket is rotated one revolution by the filmstrip F. A known film transport apparatus 46 including a drive motor 47 is connected to the take-up spool 33 for rotating the spool in a film winding direction and alternatively is connected to a rewind spindle 48 in the loading chamber 16 for rotating the spindle in a film winding direction to similarly rotate the cartridge spool 9. The take-up spool 33 has circumferential teeth 49 for engaging the film leader L at its respective perforations P'. An open-biased film presence sensing or take-up switch 51 is located between the exposure window 27 and the take-up spool 33 for closure by an inclined edge 53 of th∶ filmstrip F to detect the beginning of the full width section 15 of the film leader L after the reduced width section 14 of the leader is securely attached to the spool by engagement of the perforations P' and the teeth 49.

OPERATION

To load the 35 mm camera 1, the film cartridge C is inserted into the loading chamber 16 and the cartridge spool 9 is engaged with the rewind spindle 48. Then, a forward edge 55 of the film leader L is aligned with a marker 57 adjacent the take-up chamber 31 to position one or more of the perforations P' for engagement with the teeth 49 of the take-up spool 33.

Figure 3:
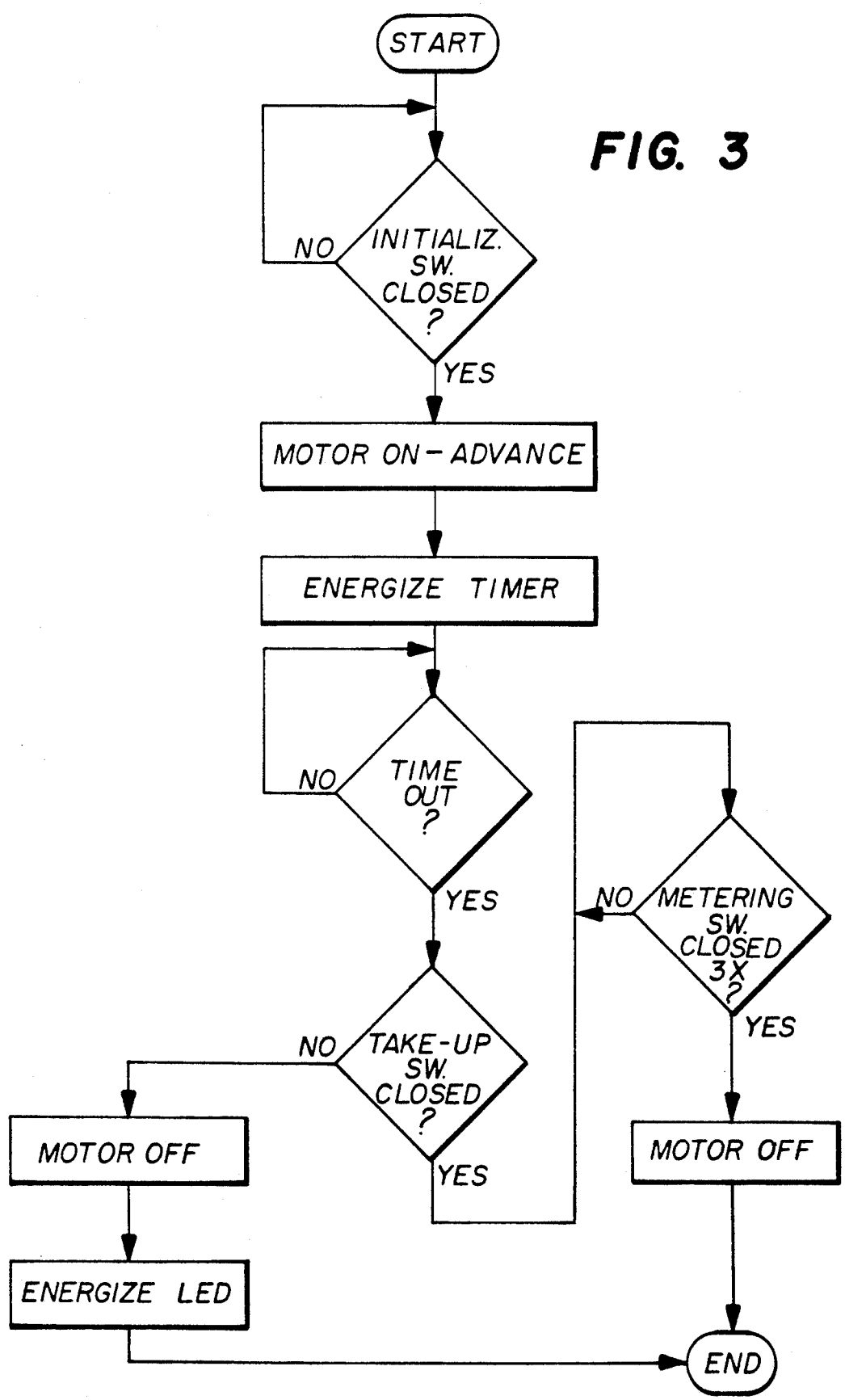
FIG. 3 is a flow chart illustrating operation of the film take-up confirming mechanism.

As indicated in FIG. 3, if the shutter release button 39 is initially depressed to close an open-biased initialization switch 59, the drive motor 47 will be energized via control means in the form of a microcomputer 61 including a central processing unit (CPU) 63, a read-only memory (ROM) 65, and a random access memory (RAM) 67, to rotate the take-up spool 33 in a film winding direction. Simultaneously, the microcomputer 61 energizes a timer 69 to begin a timed period that is sufficient for the reduced width section 14 of the filmstrip F to be securely attached to the take-up spool 33 and wound onto the spool. After the timed period has elapsed, if the take-up switch 51 remains open because it was not closed by the inclined edge 53 of the film leader L, i.e. there is a film take-up malfunction, the microcomputer 61 will de-energize the drive motor 47 and will energize a light-emitting diode (LED) 71 on the top of the camera body 5 to provide a visible indication of the take-up malfunction. Conversely, if the take-up switch 51 is closed, i.e. there is no film take-up malfunction, the metering switch 44 will be closed by the projection 45 on the metering sprocket 41 each time the sprocket is rotated one revolution due to advancement of the filmstrip F a frame increment onto the take-up spool 33. When the metering switch 44 is closed three times (3x), the first available frame of the filmstrip F will be positioned at the exposure window 27. Then, the microcomputer 61 will de-energize the drive motor 47.

The invention has been described with reference to a preferred embodiment. However, it will be appreciated that variations and modifications of the invention can be effected by a person skilled in the art without departing from the scope of the invention.

I claim:

1. An improved camera wherein (a) a take-up spool is supported for rotation in a winding direction to securely attache a reduced width leading section of a filmstrip to said spool and to wind that section and a full width following section to the filmstrip onto the spool, and (b) a film edge sensing element is located to detect and inclined film edge at the beginning of the full width section of the film strip after the reduced width section of the filmstrip is securely attached to the spool and wherein the improvement comprises:

said film edge sensing element is a switch located to be actuated by the inclined film edge at the beginning of the full width section of the filmstrip;

motorized means energizable for rotating said take-up spool in the winding direction; and control means connected to said switch and said motorized means for first energizing the motorized means to rotate said take-up spool in the winding direction and then, when a sufficient time has elapsed for the reduced width section of the films trip to be attached to the spool, either de-energizing the motorized means should the switch fail to be actuated by the inclined film edge at the beginning of the full width section of the filmstrip or alternatively allowing the motorized means to remain energized to continue to rotate the spool in the winding direction should the switch be actuated by the inclined film edge at the beginning of the full width section.

2. An improved camera wherein (a) a take-up spool is supported for rotation in a winding direction to securely attache a reduced width leading section of a filmstrip to said spool and to wind that section and a full width following section of the filmstrip onto the spool, (b) a film edge sensing element is located to detect and inclined film edge at the beginning of the full width section of the filmstrip after the reduced width section of the filmstrip is securely attached to the spool, and (c) a film motion sensing switch is located to detect film movement of successive frame increment as the filmstrip is wound onto the spool, and wherein the improvement comprises:

said film edge sensing element is a second switch located to be actuated by the inclined film edge at the beginning of the full width section of the filmstrip;

motorized means energizable for rotating said take-up spool in the winding direction; and control means connected to said second switch, said film motion sensing switch, and said motorized means for first energizing the motorized means to rotate said take-up spool in the winding direction and then, when a sufficient time has elapsed for the reduced width section of the filmstrip to be attached to the spool, either de-energizing the motorized means should the second switch fail to be actuated by the inclined film edge at the beginning of the full width section of the filmstrip or alternatively allowing the motorized means to remain energized until the film motion sensing switch detects sufficient film movement to position a first available frame of the filmstrip for exposure should the second switch be actuated by the inclined film edge at the beginning of the full width section.

3. The improvement as recited in claim 2, wherein said control means includes warning means for providing a visible indication that the reduced width section of the filmstrip is not attached to the spool when a sufficient time has elapsed for the reduced width section to be attached to the spool and said second switch not be actuated by the inclined film edge at the beginning of the full width section of the filmstrip.

* * * * *